United States Patent Office 3,144,356
Patented Aug. 11, 1964

3,144,356
BATTERY GRID ALLOY
Andor Dobrovics, Cleveland, Ohio, now by change of name Andor Dover, assignor to The Electric Storage Battery Company, a corporation of New Jersey
No Drawing. Filed Aug. 11, 1960, Ser. No. 48,846
6 Claims. (Cl. 136—65)

This invention generally relates to electrodes for lead-acid type storage batteries. More specifically, the present invention is concerned with a new and improved alloy from which the electrode grids are cast.

In lead-acid type storage batteries it is customary to employ an alloy of lead and antimony for the grids or supporting structures for the active materials of the positive and negative electrodes, the antimony being included in the grid alloy to strengthen the alloy, enhance its casting qualities and to facilitate the handling of the grids after their removal from the mold. In an effort to reduce battery weight, save lead, and provide batteries with higher capacity and capable of higher rates of discharge, the trend in storage battery manufacture is toward the utilization of thinner grids. Grids 0.060 inch thick are common today and in order to mass produce battery plates utilizing such grids, they must be capable of machine pasting and drying without substantial bending or distortion. In addition, it is common practice to "size" battery grids in a milling machine to assure uniformity and also to permit the utilization of the same casting for more than one type of grid. In such a sizing operation, a battery grid may be reduced in thickness by as much as 0.008 inch and accordingly this operation also requires that battery grid castings must be sufficiently rigid to be so processed. With conventional lead-antimony alloys, it is necessary to age battery grids for periods of from five to seven days before they obtain the rigidity or stiffness necessary for efficient pasting and handling. The storing of freshly cast grids to permit age hardening not only necessitates additional storage area but it also requires higher lead inventories. While it is known that lead base alloys containing antimony may be aged and hardened in a lesser time by suitable treatment, such treatment has not been proven to be economically suited for the mass production of battery grids.

It is therefore an object of the present invention to provide a new and improved lead-antimony grid alloy which is adapted to be hardened with a water quench and be stiff enough for sizing and pasting within eight hours after casting.

The antimony utilized in battery grid metal has no detrimental effect on battery operation provided it remains in the grids and is not deposited on the active material of the negative electrodes. When antimony is present in the active material of the negative electrodes it causes self-discharge or local action and the formation of lead sulfate or sulfation. As a result of local action a standard automobile battery will lose approximately 25% of its capacity in four weeks when stored at a temperature of 95° F. Sulfation is characterized by the formation of hard granular lead sulfate particles in the active material which resists electrochemical reconversion on charge and hence represents a permanent loss in battery capacity.

It has been observed that antimony tends to leach out of the positive grids during formation and upon charging and deposits on the negative electrodes. In addition, corrosion of the positive plate grid structure also may supply antimony to the negative electrodes in sufficient amounts to seriously affect their performance. Antimony also tends to dissolve from the negative grids during the pasting and setting steps of electrode manufacture further contaminating these electrodes.

In an effort to improve corrosion resistance and reduce self-discharge, attempts have been made to develop alloys in which antimony is completely absent or present only in reduced amounts. All of these attempts, however, have been unsuccessful in producing grids adapted for mass production battery manufacturing techniques inasmuch as the grids produced have been too soft to be machine pasted. In addition to lacking the strength for efficient handleability, prior art antimony free or low antimony grid alloys have been extremely difficult to cast. Other alloys of lead have been proposed at various times and some of these have been used in storage batteries to a limited extent. For example, lead-calcium alloys have been utilized in batteries where service requires them to float on a carefully regulated line. While satisfactory for such limited service, the lead-calcium alloy batteries have proven to be completely unsatisfactory in applications where they are subjected to cycling and overcharge. In general, however, none of these other metal alloys have been found suitable for automotive application.

It is therefore another object of the present invention to provide a new and improved grid alloy in which antimony is present in reduced amounts by reason of an improved alloy formulation which is adapted by reason of its physical characteristics and good corrosion resistance for widespread application, particularly in automotive type batteries.

It is a further object of the present invention to provide a new and improved low antimony alloy of lead which is characterized by its ability to be sized, machine pasted and efficiently handled as well as being practical to cast into grids of ordinary design.

In accordance with the present invention, there is provided a new and improved alloy for battery grids in which cadmium is utilized in an alloy with lead, tin, arsenic and antimony to provide battery grids characterized by fast aging, handleability, castability and resistance to corrosion and growth. While cadmium has been used previously in an alloy with lead alone in an effort to produce suitable battery grids having low antimony content, such prior art alloys have not proven to be as satisfactory as conventional lead-antimony alloys. In accordance with the present invention, it has been found that the utilization of cadmium in a range from 0.3% to 0.01% in combination with antimony in the range of 2.0% to 6.0% is optimum to provide battery grids having the desirable characteristics enumerated above. Further, it has been found that when cadmium is utilized in the proportion specified, battery grids may be hardened with a water quench and be adaptable for sizing and pasting within eight hours after casting.

Other objects and advantages of the present invention will be readily apparent to those skilled in the art in view of the following detailed description of the invention and preferred embodiments thereof.

In carrying out the present invention in general form thereof there is provided a grid metal alloy containing antimony in an amount from 2.0% to 6.0%; cadmium in an amount of 0.3% to 0.01%; arsenic in an amount from 0.3% to 0.8%; tin in an amount from 0.14% to 0.7% and the balance lead. It should be noted that the amount of cadmium utilized in this grid alloy varies inversely with the amount of antimony utilized permitting utilization of as little as 2.0% antimony. Still further, in accordance with the present invention, the amounts of tin and cadmium present in the alloy should not be less than 0.15% which permits the elimination of tin from the alloy where higher amounts of cadmium are utilized within the limits specified. A preferred medium antimony alloy typical of the present invention contains 4% antimony; 0.06% cadmium; 0.5% arsenic; 0.5% tin and the balance lead. A preferred low antimony alloy typical of the present invention contains 2.5% antimony; 0.3% cadmium; 0.5% arsenic and the balance lead.

In considering the alloy of the present invention, the antimony present contributes to the castability and strength of grids made from the alloy. The cadmium content of the formulation is effective in providing the alloy with the hardness and stiffness required to produce grids adapted for sizing and the mechanical pasting within eight hours after casting. The inclusion of arsenic within the proportions specified increases the resistance of the alloy to corrosion and growth and in combination with the cadmium contributes to the hardness of the alloy. The tin component of the formulation in interaction with antimony and the cadmium is effective to improve the castability of the alloy by improving its flow characteristics in the molten state. As noted hereinbefore, cadmium and tin must be present in an amount of at least 0.15% to provide the alloy with the fluidity necessary for castability. Accordingly, when cadmium is present in an amount greater than 0.15%, tin is not an essential ingredient of the alloy.

The alloy of the present invention may be produced in the conventional manner by adding the alloying materials in solid form to molten lead. In the casting of battery grids, the alloy is heated to a temperature sufficient to insure the homogeneous alloying of the constituents. For this purpose a temperature of approximately 850° F. has been found to be suitable. It has been found that the alloy has casting qualities that make it particularly suitable to the mass production of thin battery grids. To accelerate the hardening of the alloy to a stiffness sufficient for sizing or machine pasting, it has been found desirable to rapidly cool grids cast of the alloy as they come from the mold. To accomplish this, it has been found satisfactory to utilize a fine water spray. As mentioned hereinbefore, this treatment has been found operative to produce grids of sufficient stiffness to be machine pasted within eight hours after casting.

In order to demonstrate the fast aging qualities for an alloy in accordance with the present invention, comparison tests were conducted between grids made of such an alloy and grids of a conventional alloy. Specifically, battery grids were cast of a conventional alloy comprising 6% antimony, 0.5% arsenic, 0.5% tin and the balance lead, and identified as grids "A." Battery grids were also cast of an alloy in accordance with the present invention which was identical in composition to the alloy of grids "A" but including 0.015% cadmium and identified as grids "B." Grids B were subjected to a water spray as they were ejected from the grid molds. For the purpose of the test, grids of types "A" and "B" were clamped between two horizontal metal plates of equal length so that one-half of the grid extended outward from between the plates. At the edge of this free portion of the grids a one pound weight was hung which tended to bend them downward at the edge of the metal plates. The degree of displacement of the extended half of the grids from the horizontal was taken as a measure of their stiffness. The results of this test are indicated below in Table 1.

of the standard alloy. While the test noted above is qualitative, grids which will not bend more than about 45 degrees under the condition specified, are considered to be adapted for sizing and machine pasting. With reference to Table 1, it will be noted that the grids "B" had such stiffness characteristics approximately eight hours after they were cast. While not shown in Table 1, grids "A" did not reach this desired degree of stiffness until about five days after casting. Accordingly, the results of this test clearly indicate that the utilization of an alloy in accordance with the present invention permits more rapid battery plate production and, by the elimination of waste brought about by a lack of stiffness, more economical battery production.

As noted above, the utilization of an alloy in accordance with the present invention also permits a reduction in the antimony content of the alloy. The reduction of the antimony content of an alloy has been found to substantially reduce local action or stand-loss and also to improve battery overcharge life. The effect of local action or stand-loss in a lead acid battery may be determined by measuring the drop in specific gravity of the battery electrolyte during an open circuit stand. In order to demonstrate the resulting reduction in local action in batteries having plates cast of a low antimony alloy in accordance with the present invention during an open circuit stand, the following test was made. Two batteries were built, identical in very respect except for the grid alloy employed. One battery, identified as Battery "A," had grids cast of a conventional alloy comprising 6% antimony, 0.5% arsenic, 0.5% tin, and the balance lead. The other battery, identified as Battery "B," had grids cast of an alloy comprising 2.5% antimony, 0.8% arsenic, and 0.2% cadmium, and the balance lead.

On tests, the two batteries were subjected to identical treatment, that is, they were charged in series for the same length of time and maintained a constant temperature of 95° F. After bringing the batteries to fully charged condition, the batteries were left on open circuit stand and the specific gravities of their electrolytes were measured at two week intervals. The results of this test are tabulated below in Table 2.

TABLE 2

| Weeks | Specific Gravity Drop | | |
|---|---|---|---|
| | Battery A | Battery B | Difference |
| 2 | 25 | 22 | 3 |
| 4 | 39 | 33 | 6 |
| 6 | 56 | 44 | 12 |
| 8 | 77 | 53 | 24 |
| 10 | 93 | 66 | 27 |
| 12 | 108 | 76 | 32 |

From the results of this test, it will be observed that local action in Battery "A," the battery with a conventional alloy, resulted in a stand-loss which was appreciably higher than that resulting in Battery "B," the battery having grids cast of an alloy in accordance with the present invention. It should also be noted that the difference in stand-loss between the two batteries became progressively higher in Battery "A" as the tests progressed. It should

TABLE 1

*Degree of Bend*

| Hours | 0 | 2 | 4 | 6 | 8 | 10 | 12 | 14 | 16 | 18 | 20 | 22 | 24 | 26 | 28 |
|---|---|---|---|---|---|---|---|---|---|---|---|---|---|---|---|
| Grids A | 80.0 | 75.0 | 70.0 | 67.5 | 66.0 | 65.0 | 65.0 | 65.0 | 65.0 | 65.0 | 65.0 | 65.0 | 65.0 | 64.0 | 62.5 |
| Grids B | 57.5 | 52.5 | 49.5 | 47.5 | 45.5 | 44.0 | 43.0 | 42.5 | 42.0 | 41.5 | 41.0 | 40.8 | 40.5 | 40.0 | 39.5 |

It will be observed that grids "B," grids cast of an alloy in accordance with the present invention, exhibited vastly improved stiffness qualities compared with the grids cast also be noted that this test was carried out under severe condition in that local action is known to occur in a higher rate at elevated temperatures.

Batteries of types "A" and "B" were also subjected to an overcharge test which is a measure of their grid corrosion resistance. For this test, the batteries were charged at 990 ampere hours at the rate of 9 amperes each week followed by a 48-hour stand period and then discharged at 300 amperes to an end voltage of an equivalent of 1.2 volts per cell or a minimum discharge time of 30 seconds, whichever occurred first. During the entire test the batteries remained in a water bath maintained at 100° F. The number of life units was determined by counting the number of weeks during which the batteries were capable of delivering 300 amperes discharge for 30 seconds before their voltage dropped to the equivalent of 1.2 volts per cell. Water was added daily during the charge to restore electrolyte level to normal. Under this test, Battery "A" gave 11 weeks of life whereas Battery "B" gave 16 weeks of life. It is felt that the additional 5 weeks of overcharge life can be attributed to the utilization of a low antimony alloy in accordance with the present invention.

In further considering the alloy of the present invention, it should be understood that the many advantages achieved through its use have been gained without sacrificing any other desirable alloy characteristics. Grids cast of the alloy have been found to be dimensionally stable, uniformly sound and accurate reproductions of the mold cavities used in their casting.

Having described the present invention, that which is claimed as new and which it is desired to secure by Letters Patent:

1. In a storage battery grid containing from 2.0% to 6.0% antimony, 0.3% to 0.8% arsenic, 0.14% to 0.7% tin and the balance lead, the improvement which consists of the addition of from 0.3% to 0.01% cadmium, in inverse proportion to the amount of antimony present.

2. A storage battery grid prepared from an alloy consisting essentially of 2.5% antimony, 0.3% cadmium, 0.5% arsenic and the balance lead.

3. A storage battery grid prepared from an alloy consisting essentially of 4% antimony, 0.06% cadmium, 0.5% arsenic, 0.5% tin and the balance lead.

4. A storage battery grid prepared from an alloy consisting essentially of from 2.0% to 6.0% antimony, 0.3% to 0.8% arsenic, 0.15% to 1% of a metal selected from the group consisting of cadmium and tin and combinations thereof, the cadmium always being present in an amount of between 0.01% and 0.3% and the balance lead.

5. A method for preparing a storage battery grid which comprises casting in the form of a grid an alloy consisting essentially of from 2% to 6% antimony, 0.3% to 0.8% arsenic, 0.15% to 1% of a metal selected from the group consisting of cadmium and tin and combinations thereof, provided that cadmium is present in an amount of between 0.01% and 0.3%, and the balance of the alloy is lead, and thereafter quenching the grid with water.

6. The method of claim 5 in which the alloy consists essentially of 2.5% antimony, 0.3% cadmium, 0.5% arsenic and the balance lead.

References Cited in the file of this patent

UNITED STATES PATENTS

| 1,807,788 | Kemp | June 2, 1931 |
| 2,060,533 | Singleton et al. | Nov. 10, 1936 |
| 2,375,755 | Bassett et al. | May 15, 1945 |
| 2,446,996 | Bouton et al. | Aug. 17, 1948 |
| 2,678,341 | Stoertz | May 11, 1954 |

FOREIGN PATENTS

| 209,749 | Great Britain | 1925 |

OTHER REFERENCES

Vinal et al.: Bureau of Standards Research Paper RP 567, Bureau of Standards Journal of Research, vol. 10, June 1933, pages 795 to 808.